United States Patent [19]
Hwu
[11] Patent Number: 4,926,562
[45] Date of Patent: May 22, 1990

[54] CLOSED TYPE OF LINE MARKING DEVICE

[76] Inventor: Chyn-Herng Hwu, 10 Fl, 76, Lane 131, Shin-Yi Rd., Sec. 3, Taipei, Taiwan

[21] Appl. No.: 278,758
[22] Filed: Dec. 2, 1988
[51] Int. Cl.5 .......... G01B 3/02
[52] U.S. Cl. .......... 33/414
[58] Field of Search .......... 33/414, 413, 756, 761

[56] References Cited

U.S. PATENT DOCUMENTS

| | | | |
|---|---|---|---|
| 517,720 | 4/1894 | Anderson | 33/414 |
| 1,271,470 | 7/1918 | Ibaraki | 33/414 |
| 4,773,162 | 9/1988 | Lin | 33/414 |

FOREIGN PATENT DOCUMENTS 18898 of 1893 United Kingdom .

Primary Examiner—Harry N. Haroian
Attorney, Agent, or Firm—Cushman, Darby & Cushman

[57] ABSTRACT

A closed type device for line marking comprises a box-shaped body and a circular partition wall dividing the inner space of the body into a space for a bobbin seat and a closed space surrounding the outer surface of partition wall for the storage of Chinese dark ink as an ink space. The ink space is stuffed with an ink absorbent material and the bobbin seat is adapted to receive the bobbin in concealed manner. A flexible thread of absorbent material is wound onto the bobbin. The closed ink space prevents the ink from leaking out of the line marking device. The closed arrangement for the body and bobbin make the device easy to operate and convenient to carry by the user.

5 Claims, 5 Drawing Sheets

CLOSED TYPE OF LINE MARKING DEVICE

FIELD OF THE INVENTION

The closed type line marking device according to the invention has such advantageous features that it can keep the ink from leaking out, and is compact and convenient to carry along.

DESCRIPTION OF THE PRIOR ART

The line marking device has been used for quite a long time by the carpenters, bricklayers and other kinds of workers to mark a straight line on a working piece. It principally comprises a body with one end provided with an open ink box stuffed with absorbent material (such as sponge) and Chinese dark ink and a bobbin having thread wound thereon at the other. The thread is also made from absorbent material and extends through a hole at the lower portion of the ink box and passes through the ink absorbent material and exits through a corresponding hole at the opposite side of the ink box near the bottom of the body. The wet ink will be absorbed by the thread as the thready passes through the ink box.

During operation, the thread will be pulled out along a work piece and imprint a line mark thereon. As the thread has been placed in correct position, shaking the tensioned thread up and down slightly will cause the wet ink on the thread to be transferred to the work piece and imprint a straight line thereon as desired.

In the conventional line marking devices, the thread has to be pulled back upon completion of an operation. The thread will again absorb the wet ink as it passes through the ink box. At this time, the wet ink might spread all over the flange of the bobbin and cause the user's hand to become dirty. In addition, since the ink box is kept in the open air, it is likely to contaminated the user and is not suitable to carry along.

The object of this invention is to provide a line marking device, in which the ink case which is stuffed with ink absorbent material imbued with Chinese dark ink is arranged in a closed manner, and the bobbin is installed in the body in a concealed position thereby preventing the wet ink from leaking out and facilitating the carrying of the device.

SUMMARY OF THE INVENTION

In one preferable embodiment, the invention comprises a circular partition wall within a boxshaped body. The circular partition wall devides the inner space of the body into a round space for housing a bobbin in a concealed manner as a bobbin seat and a closed space for housing ink. The ink space is stuffed with ink absorbent material imbued with Chinese dark ink (such as sponge or cotton fabric). A bobbin is pivotally mounted in the bobbin seat with a flexible thread to be wound thereon. The thread is also made from absorbent material. The thread is adapted to pass through a needle path formed at one end of the body. The needle path together with a cooperating plug cap, and the ink space surrounding the bobbin seat forms a closed enclosure which can keep the ink from leaking out. The arrangement of the bobbin seat which accommodates the bobbin within the body in a concealed manner facilitates the carrying by the user as well as operation of the invention.

In a further embodiment of the invention, a number of pulleys are provided in the ink space at the places where the thread is to make a turn. This permits the opening between the bobbin seat and ink space to be arranged in a higher position relative to the ink space so as to reduce ink infiltration into the seat. In consideration of the placement of the thread relative to the bobbin, the surface of the axle of the pulley positioned most close to the bobbin is provided with a guide groove to permit the thread to be evenly wound onto the bobbin.

In still another embodiment of this invention, a hanger is provided at the outer surface of the body so that the device according to the invention can be hung at the waist of the user.

In still another embodiment of this invention, a foldable hand crank is provided at the side wall of the bobbin. The crank extends through the bobbin seat to the outside of the body to facilitate winding of the thread with the crank.

Other objects and advantageous features of the invention will become evident from the detailed description of the invention hereinbelow in reference to the accompanying drawings.

DETAILED DESCRIPTION OF THE INVENTION

Figure 1:
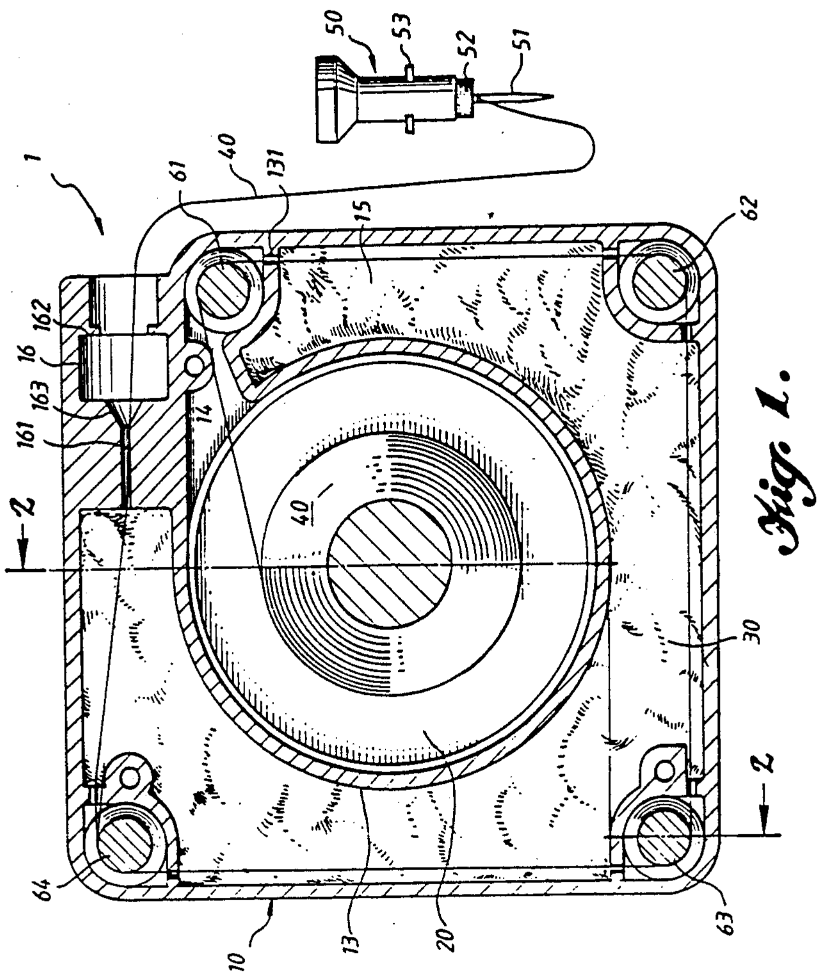
FIG. 1 is a front sectional view of the invention.
Figure 2:
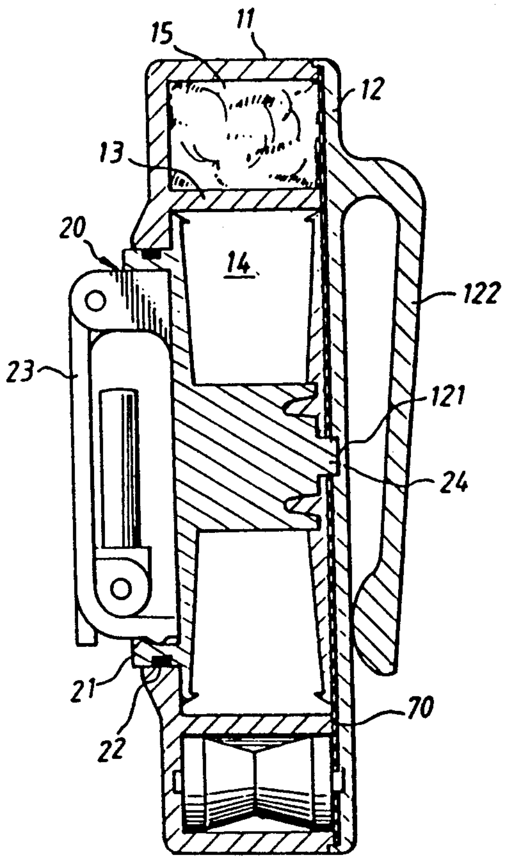
FIG. 2 is a sectional view of the invention taken along the lines 2—2 of FIG. 1.
Figure 4:
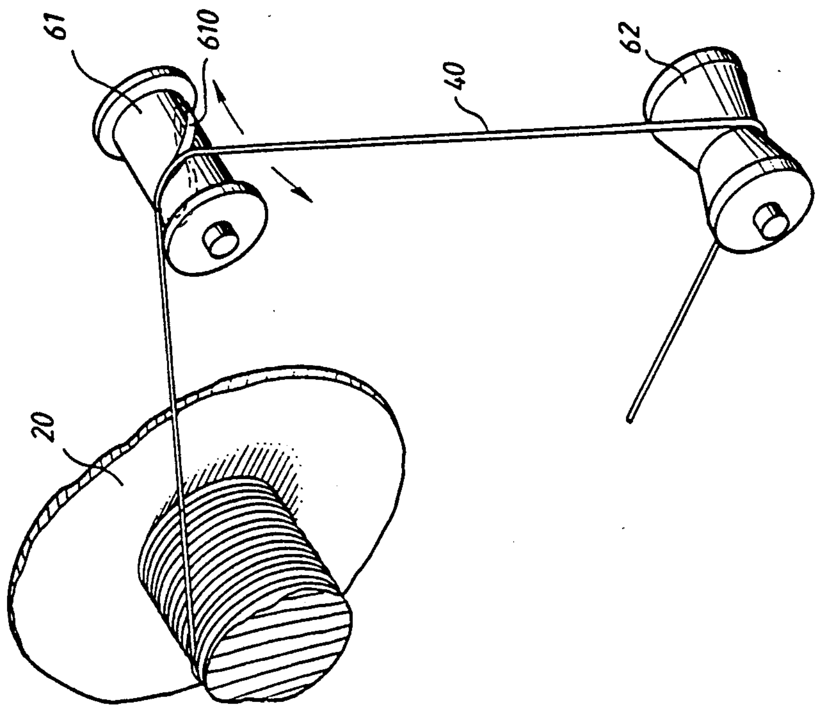
FIG. 4 is a perspective view showing the operation of a portion of the invention.
Figure 5:
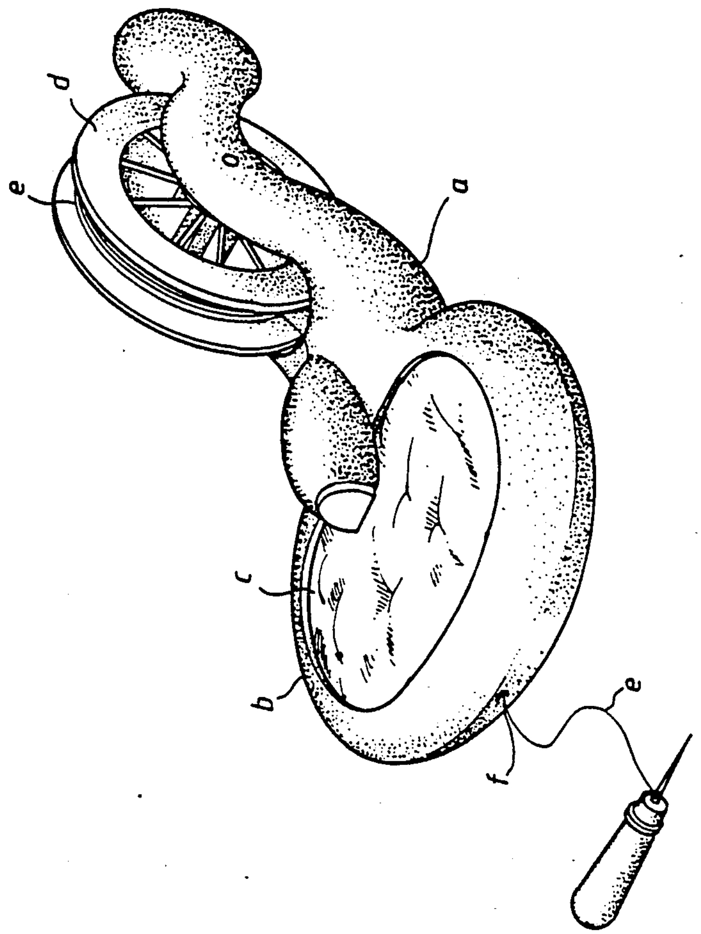
FIG. 5 is a perspective view of a conventional line marking device using Chinese dark ink.

As shown in FIGS. 1 and 2, the line marking device (1) of the invention comprises a body (10), a bobbin (20), ink absorbent material (30), a thread (40) and a plug cap (50). The bobbin (20) has at both ends a circular plate and a solid axle. The lateral wall of one end of the bobbin extends outward perpendicularly in the form of an annular flange (21). The outer surface of the flange (21) is provided with an annular channel for accommodating an O-ring (22) or other oil seal type element. On the lateral wall of one end of the bobbin (20) near the center point a foldable hand crank (23) is provided while on the lateral wall of the opposite end at the center point of a box portion (11) and a cover plate portion (12). The central part of the box portion (11) which is adapted to accommodate the bobbin (20) is provided with a circular partition wall (13) to define a bobbin seat (14) and an ink space (15). This permits the flange (21) of the bobbin (20) to stick out from the bobbin seat (14) and the bobbin (20) to be rotatable in the bobbin seat (14). At the corners of the box portion (11), pulleys (61), (62), (63) and (64) are mounted respectively. Of the pulleys, the one most close to the bobbin (20), for example, the pulley (61) as shown in FIGS. 1 and 4, is located in a high position relative to the ink space (15). On the surface of the pulley (61), a thread channel (610) is formed. As shown in FIG. 1, one end of the box portion (11) is formed with a plug seat (16) having a small and long needle path (161) with its one end terminating at a bell shaped leaking-proof seat (163), and a holding flange (162) formed at the other end of the plug seat (16).

Referring to FIG. 2, the shape of the cover plate portion (12) is adapted for closing the box portion (11) especially for closing the ink space (15). At the central location of one of its wall surfaces an axle hole (121) is formed to cooperate with the spindle nose (24) of the bobbin (20), while at the opposite wall surface a hanger (122) is provided which extends downward in a direction opposite to the mounting position of the plug seat (16) as shown in FIG. 1.

Figure 3:
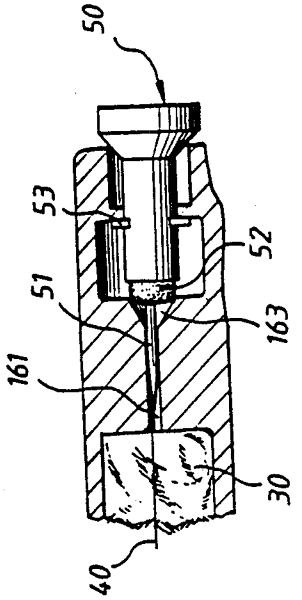
FIG. 3 is a sectional view showing the construction of a portion of the invention.

Referring to FIGS. 1 and 3, a sealing plug cap (50) is provided for plug seat (16) fixing needle (51) is sized to just extend into the needle path (161). At the root of the needle (51) a leakingproof plug (52) made of compressible material is provided. The plug (52) tightly fits into the bell shaped leaking-proof seat (163). On the middle part of the sealing plug (50), radially extending pins (53) are provided which can fit into the slots (not shown) formed in the middle part of the plug seat (16) and are tightly secured in the holding flange (162).

According to one embodiment of the invention as shown in FIGS. 1 and 2, a thread (40) is wound on the bobbin (20) with a free end passing around the pulley (61), (62), (63) and (64), extending into the needle path (161) and finally exiting from plug seat (16). The bobbin (20) is housed in the bobbin seat (14) with its flange (21) protruding through an opening which is water-tight sealed by an O-ring (22). Ink absorbent material (30) is stuffed in the ink space (15) and sufficiently imbued with Chinese dark ink. Finally, a leak stoppage gasket (70) as shown in FIG. 2 is provided in cooperation with the cover plate (12) to close the box portion (11). As a result, the spindle nose (24) extends into the axle hole (121) and the cover plate portion (12) is tightly presses onto the box portion (11) by means of a screw bolt (not shown) so as to form a close seal.

Since the ink space (15) is in a sealed condition upon the completion of assembly of this invention, the only place for the device to be connected with outside is through the small hole for the needle path (161). This small hole, however, is sealed by the sealing plug (50), the ink contained, in the body of the device is in no way to leak out. Although the bobbin (20) is in connection with the ink space (15) by way of the thread (40), the device can still remain tightly sealed. This is due to the fact that most of the wet ink is absorbed by ink material (30) leaving only a very limited amount of the wet ink for a possible leak out. Moreover, the connection between the ink space (15) and the bobbin seat (14) is only through a slit (131) which is located at a higher position relative to the ink space (15). The possible leakage can be further prevented by the O-ring (22) which is fitted in the channel formed on the annular flange (21) of the bobbin (20). Provision of the O-ring (22) further ensures that no ink can leak out of the device according to the invention and the device can be kept very clean.

In addition, the leak-proof and additional provision of the cover plate portion (12) make it possible to provide a hanger on the device. With this additional hanger, the device can be hung from the user's waist and carried along with him.

While this invention is being hung from the user's waist with the hanger (122) extending downward relative to the plug seat (16), the plug seat (16) is placed above the hanger. This further ensures that no ink could leak out from the needle path (161).

In operation, the ink thread (40) is pulled out at the free end. Since ink thread (40) has to make several turns around the pulleys (61), (62), (63) and (64), in its progress the thread (40) can absorb sufficient ink through contact with the ink material (30). For pulling back the thread (40) onto the bobbin (20), the hand crank (23) is rotated (as shown in FIG. 2) so that the thread (40) is wound onto the bobbin (20) smoothly. The groove (610) formed on the pulley (61) (as shown in FIGS. 1 and 4) can make the thread (40) to sway to the right and then left in its way returning to the bobbin (20). This enables the thread (40) to be evenly wound on the bobbin (20).

Although, a preferable embodiment of this invention has been described in detail as above, it is obvious that various modifications can be made to the device according to the invention without departing from the spirit of this invention.

I claim:

1. A closed type line marking device comprising:
- a body including a case defining the inner space of the body, a circular partition wall dividing the inner space into a space serving as a bobbin seat and a space for sealed ink, and a plug seat with a needle path at one end and an opening at the other end;
- a thread bobbin disposed in the bobbin seat;
- an ink absorbent material stuffed in the ink space;
- a plug cap provided with a fixing needle and a compressible leak stoppage plug at one end for sealing the opening of the plug seat; p1 an O-ring for leak stoppage mounted between the bobbin and the bobbin seat;
- a flexible ink thread of ink absorbent material wound on the bobbin and running through the ink absorbent material and needle path of the plug seat to the plug cap;
- said body further comprising several pulleys located at the places where the ink thread is to make a turn, for facilitating the turning and pulling of the ink thread.

2. A line marking device according to claim 1, wherein a pulley placed most close to the bobbin is formed with a guide groove at its axle for ensuring an evenly winding of the thread.

3. A line marking advice according to claim 1, further comprising a hand crank for pulling the ink thread wound on the bobbin.

4. A line marking device according to claim 1, further comprising a hanger provided on the lateral surface of said body.

5. A closed type line marking device comprising:
- a body including a space defining the inner space of the body, a circular partition wall dividing the inner space into a space serving as a bobbin space and a space for sealed ink, and a plug seat with a needle path at one end and an opening at the other end;
- a thread bobbin disposed in the bobbin seat;
- an ink absorbent material stuffed in the ink space;
- a plug cap provided with a fixing needle and a compressible leak stoppage plug at one end for sealing the opening of the plug seat;
- a leak stoppage O-ring provided between the bobbin and the bobbin seat;
- a flexible ink thread of ink absorbent material wound on the bobbin and runing through the ink absorbent material and needle path of theplug seat to the plug cap;
- said body further comprising several pulleys located at the places where the ink thread is to make a turn, for facilitating the turning and pulling of the ink thread.

* * * * *